Feb. 17, 1942.  C. ADLER, JR  2,273,747
CODED AIRPLANE LIGHT
Filed Sept. 6, 1941
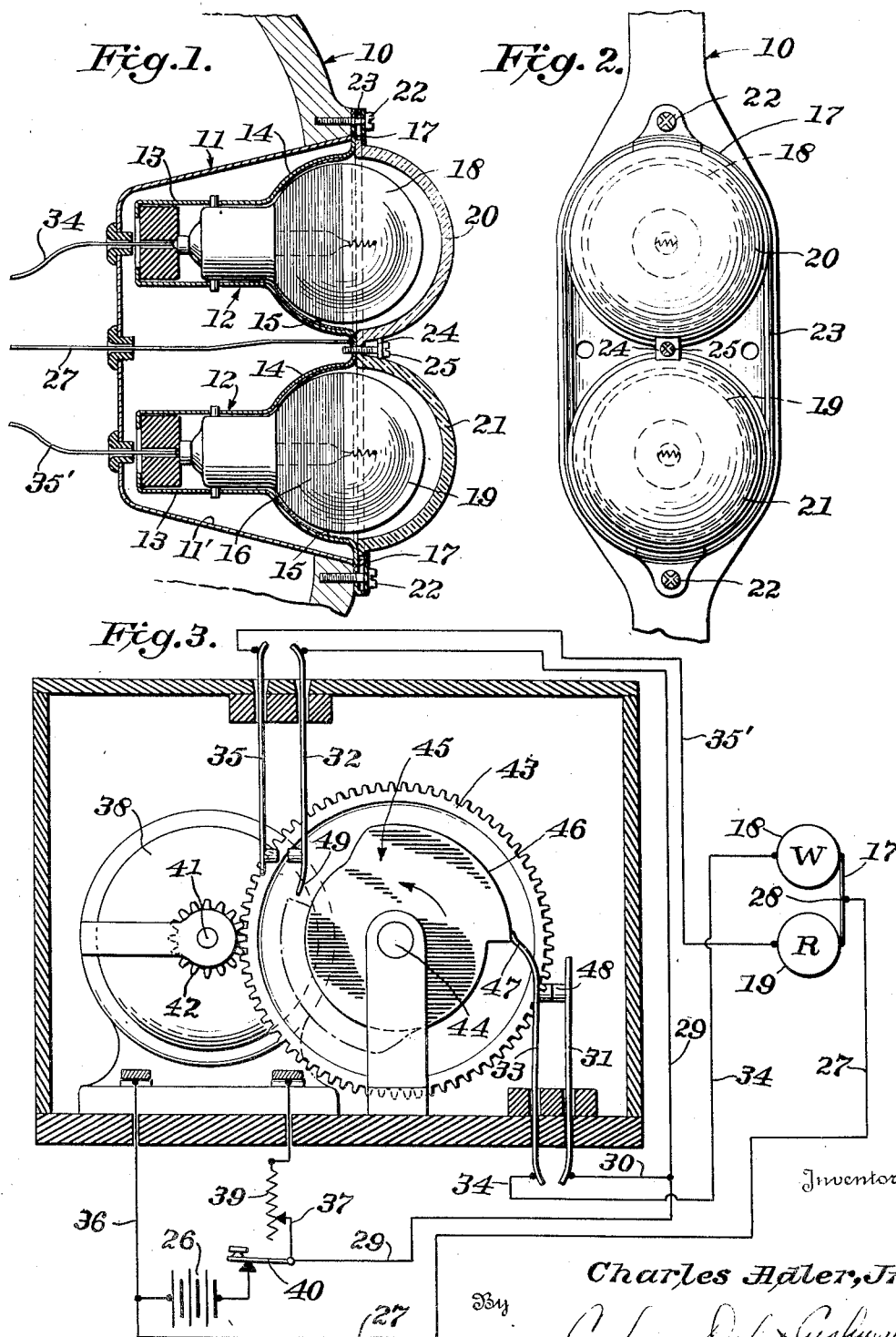
Inventor:
Charles Adler, Jr.,
By Cushman Darby & Cushman
Attorneys Patented Feb. 17, 1942

2,273,747

UNITED STATES PATENT OFFICE 2,273,747

CODED AIRPLANE LIGHT

Charles Adler, Jr., Baltimore, Md., assignor to the People of the United States of America Application September 6, 1941, Serial No. 409,876

1 Claim. (Cl. 177—329)

This invention is a coded airplane position light and is adapted to be attached, for example, to the rudder or tail of a ship and visibly present a positive flashing code signal to the pilots of other ships for denoting the position of the tail of the ship on which the light is carried.

An object of the invention is to provide a light of this character in which there is continuously projected alternately from a single visible area, rapidly consecutive contrasting colored light indications of substantially equal intensity and distribution with a short dark interval between each light indication whereby a highly distinctive and arrestive form of code indication is produced.

It is generally admitted that the conventional steady white or clear tail light lacks distinction and is readily confused with lights on the ground. A flashing white light, while an improvement, still as actual tests show, may be confused with lights of moving vehicles on the ground such as automobiles passing under trees or moving past telegraph poles. The lamp of the present invention flashes alternately white or clear and another color such as red or green, preferably red, with a predetermined dark interval between each flash and includes two independent light sources with means for alternately continuously energizing the same for predetermined time intervals with a lag between each energization and means for visibly presenting the light indications and intervening dark indications. The entire unit is streamlined in accordance with aerodynamic principles and both colors are projected from a concentrated visible area through angles ranging from 140° to 180° horizontally as well as vertically, the light sources being disposed preferably in vertically superposed relation.

The light unit has no moving parts and a flasher relay is employed which is located inside the airplane remote from the light, where it will not be subject to freezing.

Another object of the invention is to provide an improved type of flashing relay which will positively assure the alternate illumination of the colored indications for predetermined time periods and the presentation of intervening dark indications for predetermined time periods whereby the relay constitutes means for energizing and deenergizing the light sources and for maintaining the light sources both deenergized for a predetermined time period after the illumination of one of said light sources so that a coded signal giving sharply contrasting indications is produced.

An additional object of the invention is to provide a construction which can be inexpensively manufactured and installed on an airplane, e. g., in a countersunk recess in the rudder or attached to the tail of the ship. In this connection, the construction allows the unit to be installed in the rudder of an airplane in a recess of minimum size, at the same time permits light to be distributed for 180° in all directions, and of equal importance, provides a construction in which the indications are visibly presented from a small concentrated area so that they are sharply contrasting and the coded light is highly arrestive and legible.

Referring to the drawing:

Figure 1 is a vertical section showing the installation of the unit having lamps disposed in vertical alignment disposed in a countersunk recess in the rudder of an airplane.

Figure 2 is an elevational view of the signal indication; and

Figure 3 is a diagrammatic view of an improved flasher relay for operating the signal shown in Figures 1 and 2 and which forms an integral part of the signal mechanism.

Referring to Figure 1, I have indicated the rudder of an airplane as a whole at 10. This rudder is provided in its outer vertical edge portion with a countersunk recess 11, preferably in the form of a casing 11', integral with the rudder or attached to tubes and struts of the same for receiving the lamp constructions indicated as a whole at 12. I have found that by disposing the lamps in vertical spaced relation, as shown in Figure 2, that the countersunk recess or casing in the rudder may be of minimum size and at the same time allow for the use of an optical system which will assure that the light will be distributed through a range of substantially 140° to 180° both vertically and horizontally. Of equal importance with this construction, the lamps may be disposed in intimate spaced relation so that the visible code indication will be legibly presented from substantially a single concentrated area at the tail of the airplane. In addition, by disposing the lamps in vertical superposed alignment in the outer vertical edge of the rudder, the unit is streamlined into a streamlined recess 11 in the rudder without increasing drag.

Each lamp construction includes a socket 13 which terminates in a flared portion 14 which partially encloses the lamp as shown. The flared portion on its inner surface may be provided with a mirrored finish 15, and since it is disposed in close proximity to the lamp bulb, will afford a satisfactory reflector. Instead of having the flared portions 14 provided with a reflection surface 15, each lamp may have a reflecting surface 16 coated upon it for a portion of its area as shown. The flared portions 14 are integrally connected to a support or plate 17 and may be integrally formed or stamped therefrom if desired. In this manner, a rigid support is provided for the lamp sockets, and lamps received therein, and the reflectors, when the latter are used, and the lamps are held fixed in intimate spaced relation so that only a relatively small recess need be made in the rudder to receive the installation.

The plate 17 is fixed to the wall of the recess 11 in any suitable manner which will afford a rigid construction being preferably connected at the mouth of the recess so that the lamp bulbs 18 and 19 and their respective cover glasses 20 and 21 project beyond the outer edge of the rudder. The plate 17 is of generally oval shape and may have integral lugs by which it is secured to the ribs or tubes of the rudder or the casing 11' through the medium of screws 22, as shown in Figure 2.

The lamp bulbs 18 and 19 are clear while the cover glasses 20 and 21 are respectively clear and red. The cover glasses are streamlined, being substantially semispherical or cup-shaped as shown. By having an installation in which the bulbs 18 and 19 project beyond the plane of the plate 17 and the outer vertical edge of the rudder, the lamps may be closely spaced, and closely spaced cover glasses of the character described may be employed so that the unit is relatively small and of corresponding decreased weight. The wiring is simplified and of equal significance, no appreciable increase in drag is created. Moreover, the streamlined cover glasses likewise project beyond the plane of the plate 17 and the adjacent edge of the rudder and since the lamps and their projecting portions are enclosed by the cover glasses, no obstruction is presented to the distribution of the light notwithstanding that a pair of light sources is utilized, and the light is thus disseminated through a range of 180° both vertically and horizontally. The plate 17 is provided with an upstanding flange 23 against which the edges of the cover glasses bear and between the cover glasses, there is provided a bracket 24 having curved surfaces conforming to the adjacent wall surfaces of the cover glasses and which is adjustably secured to the plate 17 by means of a screw 25 whereby the cover glasses are detachably locked in position. This construction also affords a means of having the light sources and cover glasses disposed in closely spaced relation so that the alternate contrasting illuminated and dark indications are made sharply visible and legible since they are all projected from substantially the same point. This is an important feature of the invention since it enables the alternate red and clear or white indications and the intervening dark indications to be continuously repeatedly displayed in the sequence stated in a manner to provide an arrestive coded signal.

Referring to Figure 3, the lamps 18 and 19 are energized from a battery 26 from which lead a common wire 27 grounded to the supporting plate 17 as shown at 28 and a wire 29, having a lead 30 to spring contact finger 31 and connected to another contact finger 32 of a relay which will be presently described. The companion spring contact finger 33 of the finger 31 has a lead 34 to the lamp 18 of the clear lamp assembly and the companion finger 35 of the spring contact finger 32 has a lead 35' to the lamp 19 associated with the red colored cover glass 21. The battery also has two leads 36 and 37 connected to a suitable electric motor 38 which is mounted within the airplane at some convenient point. This motor is of low voltage and light weight. A rheostat 39 is interposed in the lead 37 for controlling the speed of the motor and a suitable switch 40 is provided for opening and closing the motor and lamp circuits. The motor 38 has a shaft 41 upon which is mounted a suitable small gear 42 which meshes with a large gear 43 mounted upon a shaft 44. Rotatably mounted upon the shaft 44 is a cam wheel 45 made of insulating material. The peripheral cam portion 46 is of predetermined length so as to produce alternate energization of the lamps 18 and 19 for predetermined time periods and for maintaining the light sources both deenergized for a predetermined time interval after the illumination of one of the light sources. That is to say in the rotation of the cam wheel 45, the cam portion 46 will, for example, engage the projection 47 of the spring contact finger 33 to move the same and make contact as shown at 48 with its companion spring contact finger 31 whereby the clear indication will be given for the time period based on the length of the cam portion 46 and the speed of rotation of the shaft 44. When the cam portion 46 is disengaged from the projection 47, the contact between the fingers is broken and there takes place an intervening period during which the cam surface 46 engages neither the projection 47 nor the projection 49 of the contact finger 32 and for this period, there is no signal indication. The extent of this dark intervening period may be controlled in any suitable manner but is preferably less than the duration of the periods during which one or the other of the lamps 18 or 19 is energized. At the conclusion of this intervening dark period after the white illumination, cam surface 46 engages the projection 49 to make contact between the spring fingers 32 and 35 for illuminating the lamp 19 to give the red indication. The time of engagement of the cam surface with the projection 49 and hence the illumination of the red indication may be controlled in any suitable manner but is preferably equal to the period of illumination of the preceding clear or white illumination. After the cam surface 46 moves out of engagement with projection 49, the spring finger 32 breaks contact with spring finger 35 and another intervening dark period is produced since the cam is no longer in engagement with either the projection 49 or the projection 47. This dark period after the red indication, i. e., before the white indication is again given, is of greater duration than the dark period which follows the white indication and before the red is given. The signal indications described wherein the alternating red and white indications are of equal duration and the intervening dark indications are of unequal duration with each other and with the illuminated indications is controlled in any suitable manner, and in the present mechanism this control is accomplished by the circumferential length of the cam portion 46 engaging the projections 47 or 49 and the speed of rotation of the motor 38 which is controlled by the rheostat 39.

It is to be understood that the motor 38 is continuously operated to continuously and repeatedly display in the sequence stated the alternate contrasting red and white indications with intervening dark periods between each indication. The construction described includes light indications and means for alternately energizing the same and maintaining the light indications both deenergized after each light indication. This means may take other forms but it must be intimately associated with the light sources so as to produce a continuously flashing coded signal in which the continuous contrasting colored and intervening dark indications are produced to convey a definite message. Of equal importance, the construction is operative regardless of the position or attitude of the plane in flight, its altitude or temperature variations encountered. In this connection, the lamp contacts of the relay 32, 35 and 31, 33 when engaged by the cam wheel surface 46 maintain continuous energization of the respective lamps throughout the predetermined time intervals of their illumination without chattering due to vibration because of the fact that all contact members are resilient and when one is brought into engagement with its companion, both contacts bend or give and wipe, and any vibration is effectively absorbed because of the resilience of the fingers. Since the signal has few parts and is light in weight, its compact structure makes it useful in small as well as large airplanes and the construction is operative regardless of how such planes are maneuvered. Moreover, the flashing signal described above provides a code which is an unmistakable indication of the presence of the rear end of an airplane.

The relay is entirely enclosed in a suitable shield so that under no circumstances will it interfere with airplane radio reception or transmission.

I claim:

An airplane position signal comprising a plurality of light projecting devices disposed closely in vertically spaced relation within the end portion of an airplane, each light projecting device including light producing means, a reflector, and a cover glass, said cover glasses being differently colored from each other and distributing the light from said light producing means through an angle of at least substantially 140° horizontally and vertically.

CHARLES ADLER, JR.